Patented July 22, 1941

2,250,346

UNITED STATES PATENT OFFICE 2,250,346

RESIN BASE WATER PAINT

Charles Barrell, Hollis, N. Y., assignor to Barrell Associates Incorporated, Jamaica, N. Y., a corporation of New York No Drawing. Application July 2, 1938, Serial No. 217,255

3 Claims. (Cl. 260—6)

The present invention relates to a resin base water paint and has for an object to provide a paint base in paste or powdered form for mixture with water to produce a paint having a synthetic resin binder.

Another object of the invention is to produce a paint composition which includes as a binding element a synthetic resin.

A further object is to produce a water paint having the coating characteristics and advantages of an alkyd resin.

Another object is to produce a water paint in powdered form which can be mixed with water to produce a thick commercial paste without the necessity of employing heat as has always been the practise in casein water paints.

Paints for admixture with water have generally been of the type known as calcimine which generally comprise a cement, lime and a protein or vegetable gelatin binder. The disadvantages of these paints are such that they are adaptable only for use in locations where the coating is not subject to the weather since the coating is not sufficiently moisture resistant and furthermore is subject to peeling, cracking and powdering. The coatings have therefore been of a generally temporary nature and have been limited to interior work.

In the past few years the advantages of certain of the synthetic resins in coating compositions have been recognized. Among these synthetic resins the alkyd resins have been found to have extremely satisfactory covering and wearing qualities. Paints including an alkyd resin or oil modified alkyd resin binding ingredient have been widely produced and sold. The paints which have been thus far used have been of the oil type or have been solutions of the resin in organic solvents. These paints are expensive and have recognized drawbacks as compared to water paints. For example, the oil paints or lacquers are premixed and are shipped and stored in liquid condition ready for application. The oil or solvent is far more expensive than water. There are also the objectionable odor and fumes from the oils and solvents. Many of these paints cannot be varied satisfactorily as to consistency by the user.

As distinguished from these paints the paint which is the subject of the present invention is prepared in dry form. This composition in concentrated form is then shipped and is prepared for use as a paint by the addition of a suitable quantity of water. The paint is applied in the manner of other paints as by brushing or spraying, and upon drying the painted surface is found to be coated with a material having a substantial portion of an alkyd resin. The alkyd resin constitutes the coating water proof so that it resists weathering, and hard so that the finish is durable. Furthermore, the resin is a strong binding agent for the fillers and pigment of the paint and it also produces a strongly adhering coating to resist flaking and cracking away from the underlying surface. The resin also holds the powdered ingredients of the paint so as to minimize any tendency to rub or powder at the surface.

The alkyd resins are known as the reaction products of the polyhydric alcohols and the polybasic acids, for example, glycerol and phthalic anhydride. The resins are frequently modified by combination with drying oils or the fatty acids of drying oils.

The manner in which the paint is made is first to form an emulsion in water of the resin together with suitable other ingredients and then to mix the emulsion with the fillers and pigments to form the dry paint.

The fillers used are the usual ingredients employed as fillers or extenders in paint. Calcium carbonate is used as a filler and to assist as a casein solvent. Fibrous asbestine is used as a reinforcing agent to strengthen the product. China clay is added as a filler and plastic to give the desired slip to the product. Finely divided mica is used for its properties in imparting flexibility and hiding power to the coating. Zinc sulphide or a lithopone is used as a white pigment and also to give plastic properties to the material. Talc is used to give slip to the paint.

The above constitute the pigments and fillers of the paint. All of these substances are well known in this art and the manner in which they may be varied and substituted is also well understood. The relative proportions of the substances will depend largely upon the necessities of use and their variation will be within the scope of the skilled paint chemist.

Casein and glue are selected from the known binders for use in this composition as assistants to the resinous binder.

In the alkyd resin emulsion a further quantity of casein is employed together with a quantity of gelatin. In this emulsion the casein is completely swelled but is not dissolved. Likewise, the gelatin in the emulsion is swelled with water but not dissolved. The alkyd resin itself is dissolved in ammoniacal alcohol. A number of other ingredients are added to the emulsion for imparting certain properties which will be later described.

The preferred form of the composition is as follows:

| Per hundred pounds of product | Preferred | | Variations | |
|---|---|---|---|---|
| | Pounds | Ounces | Pounds | Ounces |
| Triple washed calcium carbonate | 20 | | 10–25 | |
| Fibrous asbestine | 13 | | 8–15 | |
| Cold water glue | | 4 | | 3–5 |
| Domestic china clay (extra fine) | 15 | 4 | 5–20 | |
| Powdered casein (nitrogen factor 7.07) | 2 | 8 | 2–3½ | |
| Fine steamed mica (1,000 mesh) | 1 | 8 | ½–7 | |
| Zinc sulphide | 30 | | 20–40 | |
| Talc | 6 | | 1–7 | |
| Emulsion | 11 | 8 | 4–14 | |
| | 100 lbs. | | | |

The emulsion consists of the following:

*Per 11 lbs. 8 oz. of emulsion*

| | Preferred | | Variations | |
|---|---|---|---|---|
| | Pounds | Ounces | Pounds | Ounces |
| Alkyd resin solution | 5 | | 3–8 | |
| Phenol | | 4 | | 3¾–4¼ |
| Borax (powdered) | | 8 | | 4–12 |
| Neutral soap (flaked) | | 4 | | 2–6 |
| Common laundry starch | | 2 | | 1–5 |
| Tallow | | 12 | ½–2½ | |
| A lead naphthenate soap | | 2 | | 1–4 |
| Glycerine | | 2 | | 0–8 |
| Pine oil | | 1 | | 0–8 |
| Sassafras essential oil | | 4 | | 0–16 |
| 100 mesh casein (nitrogen factor 7.07) | 2 | | 1¾–4 | |
| Water | 1 | 1 | ½–3 | |
| Powdered gelatin | 1 | | ¼–½ | |
| | 11 lbs. 8 oz. | | | |

The alkyd resin solution is preferably an oil modified glycerol-phthalic anhydride resin made up to 75% resin and 25% ethyl alcohol, then the mixture is cut with about an equal quantity of water and aqueous ammonia (25%) added in the proportion of 5% of the water.

In mixing the emulsion all of the ingredients listed except the water and the gelatin are placed together in a steam jacketed mixer at normal temperature. The ingredients are slowly agitated and steam is turned into the jacket until the temperature is elevated to about 140 to 145° F. The water and powdered gelatin are separately mixed at normal temperature and then when the other ingredients have been heated to 90° the water and gelatin mixture is added. The emulsion is then thoroughly mixed for thirty minutes and loaded into suitable steel drums for storage until needed. At this point the emulsion is a heavy viscous liquid.

In making the paint all of the ingredients except the emulsion and the cold water glue are placed together in order in a mixer. The emulsion is then sprayed or very slowly added to the mixture while the mixer is in fast motion. The cold water glue is finally added to complete the product. The product consists of dry free flowing granules which may be stored and shipped as needed.

The powder is mixed with water at the ratio of approximately 40 lbs. of water to 100 lbs. of powder or more or less depending on the consistency desired. This results in a paste which can be stored and distributed to the consumers who add an additional 50% of water, more or less.

The functions of the pigments and fillers and extenders have already been discussed. The cold water glue acts as an adhesive and a drying retarder in the final product. The initial quantity of casein is used as an adhesive and it is assisted into solution by the calcium carbonate when later the proper amount of water is added to form the paint.

In the emulsion the alkyd resin contributes to the final paint its properties of strength, hardness, water proofing etc. The phenol or any suitable derivative thereof acts as a preservative for casein, starch, glue and gelatin. The borax assists in dissolving the casein and also in preserving the same.

The soap acts with the glycerine and tallow to produce a thickening of the powdered final product when mixed with water and allowed to stand. This thickening results only on standing so that the product when mixed cold with water runs perfectly freely and may be run into cans in fluid condition but yet on standing the paste acquires a heavy body. This is a great advantage since it allows the powder to be made into a thick paste weighing 15–16 lbs. per gallon by simple cold mixing with water. The paste is later diluted with further water as described to proper paint consistency.

The starch makes the paste and paint easier to handle.

The heavy metal naphthenic soap is a plasticizer for the casein and a preservative for it and the gelatin and glue. It also increases the elasticity and flexibility of the paint's wearing surface. The pine oil has emulsifying properties and also a pleasant odor. The sassafras oil is added merely as a perfuming agent and may be dispensed with or substituted for as desired. The casein in the emulsion is not dissolved until the water is added to make the paste. At that time the casein which is in a swelled condition in the mixture becomes part of the binder for the other ingredients.

The water in the emulsion is merely for wetting the gelatin. The gelatin itself has as its principal function keeping the paint moist on the walls thus allowing the painter the time to execute his work properly in the production of various effects in painting. It also increases the body of the paste in the can. The gelatin retards drying 2 to 3 times the drying time of the paint alone. It also prevents beading and running when the paint is applied to a surface.

The coating composition prepared according to the above plan is useful for both interior and exterior work. The coating remaining on a surface after drying is marked with the properties of the alkyd resins as to hardness, durability, etc. The paint surface can be washed and treated like ordinary oil painted surfaces and yet the vehicle of the paint is almost entirely water. The paint does not dry with undue rapidity since the gelatin and glue serve to retain a portion of the moisture for a considerable time. Various painted portions may therefore be joined without showing brush marks and strippling and other effects may be produced while the surface is yet tacky.

The alkyd resins may be used in many forms which have appeared commercially. Either straight or oil modified resins are useful, the exact proportions depending on concentrations and physical characteristics of the particular one.

If the alkyd resin solution content be raised, for example, to 9½ parts per 11½ parts in the example, all casein may be omitted and the binding effect of the resin relied on entirely.

I do not wish to be limited to the proportions stated since I have merely disclosed the best form of the invention known to me at this time and realize that satisfactory compositions may be made which vary widely from the proportions set out. Nor is the invention restricted to the use of particular fillers and inert substances which are in themselves well known in paints. The invention is restricted only by the scope of the following claims:

What is claimed is:

1. A composition comprising per 100 pounds by weight:

|  | Pounds | Ounces |
| --- | --- | --- |
| Triple washed calcium carbonate | 10-25 |  |
| Fibrous asbestine | 8-15 |  |
| Cold water glue |  | 3-5 |
| Domestic china clay (extra fine) | 5-20 |  |
| Powdered casein (nitrogen factor 7.07) | 2-3¼ |  |
| Fine steamed mica (1,000 mesh) | ¼-7 |  |
| Zinc sulphide | 20-40 |  |
| Talc | 1-7 |  |
| Alkyd resin solution | 3-8 |  |
| Phenol |  | 3¼-4¼ |
| Borax (powdered) |  | 4-12 |
| Neutral soap (flaked) |  | 2-6 |
| Common laundry starch |  | 1-5 |
| Tallow | 1½-2½ |  |
| Lead napththenate soap |  | 1-4 |
| Glycerine |  | 0-8 |
| Pine oil |  | 0-8 |
| Sassafras essential oil |  | 0-16 |
| 100 mesh casein (nitrogen factor 7.07) | 1¾-4 |  |
| Water | ½-3 |  |
| Powdered gelatin | ¾-1½ |  |

2. A paste for forming paint comprising the composition of claim 1 and water in substantially the proportion of 40 lbs. of water to 100 lbs. of said composition.

3. A paint comprising the composition of claim 1, water in the approximate proportion of 40 lbs. of water to 100 lbs. of said composition to form a thick paste therewith, and additional water added to the paste in amount sufficient to constitute the paint of proper brushing or spraying consistency.

CHARLES BARRELL.